(12) United States Patent
Stimmel et al.

(10) Patent No.: US 11,034,427 B2
(45) Date of Patent: *Jun. 15, 2021

(54) HEAT EXCHANGE SYSTEMS FOR ENGINE-POWERED WATERCRAFT AND METHODS OF USING SAME

(71) Applicant: Indmar Products Company Inc., Millington, TN (US)

(72) Inventors: Jason C. Stimmel, Eads, TN (US); Rachel M. Mashburn, Apopka, FL (US); Jason W. Vetzel, Brighton, TN (US)

(73) Assignee: Indmar Products Company Inc., Millington, TN (US)

(*) Notice: Subject to any disclaimer, the term of this patent is extended or adjusted under 35 U.S.C. 154(b) by 309 days.

This patent is subject to a terminal disclaimer.

(21) Appl. No.: 16/276,018

(22) Filed: Feb. 14, 2019

(65) Prior Publication Data
US 2019/0176954 A1 Jun. 13, 2019

Related U.S. Application Data

(63) Continuation of application No. 15/277,335, filed on Sep. 27, 2016, now Pat. No. 10,246,174.

(51) Int. Cl.
*F01P 3/20* (2006.01)
*B63H 21/38* (2006.01)
(Continued)

(52) U.S. Cl.
CPC ............ *B63H 21/383* (2013.01); *B08B 9/02* (2013.01); *B63J 2/12* (2013.01); *F01P 3/205* (2013.01); *F01P 2050/06* (2013.01); *Y02A 90/40* (2018.01)

(58) Field of Classification Search
CPC .. F01P 3/205; F01P 3/202; F01P 3/207; F01P 11/06; F01P 2011/065; F01P 2050/06;
(Continued)

(56) References Cited

U.S. PATENT DOCUMENTS 3,984,302 A * 10/1976 Freedman ............... B63B 59/00
  204/274
5,148,777 A * 9/1992 Brockhurst ............ B63H 20/36
  123/198 E

(Continued)

*Primary Examiner* — Grant Moubry
*Assistant Examiner* — James G Moubry
(74) *Attorney, Agent, or Firm* — Wood Herron & Evans LLP (57) ABSTRACT

A heat exchange system for use on an engine-powered watercraft includes a liquid cooling system for cooling the engine using a first heat exchanger and a water heating system using a second heat exchanger for heating water. Raw water from an external water source is passed through each heat exchanger. Water used to cool the engine coolant inside the first heat exchanger exits the watercraft. Water heated by the second heat exchanger is passed to either an intake conduit or at least one onboard accessory system for flushing thereof to kill aquatic invasive species. A valve inside the second heat exchanger opens to release heated water when the heated water reaches a temperature of at least 140° F. Heated coolant from the first heat exchanger passes through the second heat exchanger to transfer heat to the water inside the second heat exchanger.

20 Claims, 4 Drawing Sheets

(51) Int. Cl.
*B63J 2/12* (2006.01)
*B08B 9/02* (2006.01)

(58) Field of Classification Search
CPC ..... F01P 2050/02; B63H 20/30; B63H 21/38; B63H 21/383; B63J 2/12; B08B 9/02; B08B 3/00
See application file for complete search history.

(56) References Cited

U.S. PATENT DOCUMENTS

| | | | |
|---|---|---|---|
| 5,294,351 A | 3/1994 | Clum et al. | |
| 5,327,848 A | 7/1994 | Hannon, Jr. | |
| 5,389,266 A | 2/1995 | Clum et al. | |
| 5,558,108 A * | 9/1996 | Croswell, Sr. | B08B 9/0321 134/22.12 |
| 5,618,214 A | 4/1997 | Wyss et al. | |
| 5,642,691 A * | 7/1997 | Schroeder | F01P 3/207 123/41.09 |
| 5,746,270 A * | 5/1998 | Schroeder | B63H 21/10 165/41 |
| 5,954,977 A | 9/1999 | Miller et al. | |
| D541,302 S | 4/2007 | Martin, III et al. | |
| D614,104 S | 4/2010 | Waggoner et al. | |
| 7,788,913 B2 | 9/2010 | Midgley et al. | |
| 7,811,513 B2 | 10/2010 | Johnson et al. | |
| 8,043,136 B2 * | 10/2011 | Sipila | B63J 2/14 440/88 F |
| 8,650,864 B2 | 2/2014 | Waggoner et al. | |
| 9,797,294 B2 * | 10/2017 | Yin | F01P 7/164 |
| 10,246,174 B2 | 4/2019 | Stimmel et al. | |
| 10,344,662 B2 * | 7/2019 | Yin | F01P 11/18 |
| 2015/0298990 A1 * | 10/2015 | Urke | B63J 4/002 210/747.6 |
| 2016/0031542 A1 | 2/2016 | Yin et al. | |
| 2018/0016965 A1 * | 1/2018 | Yin | F01P 3/207 |

* cited by examiner

HEAT EXCHANGE SYSTEMS FOR ENGINE-POWERED WATERCRAFT AND METHODS OF USING SAME

CROSS REFERENCE TO RELATED APPLICATIONS

This application is a continuation of U.S. patent application Ser. No. 15/277,335 filed Sep. 27, 2016 which is fully incorporated herein.

TECHNICAL FIELD

The present invention relates generally to engine-powered watercraft and, more particularly, to heat exchange systems onboard engine-powered watercraft.

BACKGROUND

Motorboats and other powered watercraft generally include an internal combustion engine cooled by liquid coolant circulated by an engine cooling system. The cooling system derives its cooling effect from cool "raw" water drawn through an intake extending from the hull or other portion of the boat into the body of water in which the motorboat is operating. The raw water is then circulated through the engine directly (referred to as an "open" or "raw water" cooling system), or alternatively through a heat exchanger that in turn cools an isolated engine coolant circulated through the engine (referred to as a "closed" cooling system). Accordingly, in open cooling systems, the engine coolant is in the form of raw water. In contrast, in closed cooling systems, the engine coolant is generally in the form of a liquid chemical (e.g., glycol), fresh water or a mixture thereof, which is isolated from raw water. In both types of cooling systems, the medium, to which the engine heat is ultimately transferred, is generally raw water drawn from the body of water in which the motorboat is operating. Unfortunately, as described below, these bodies of water are increasingly falling victim to an unwanted spread of aquatic invasive species, such as zebra mussels.

The growing presence of aquatic invasive species ("AIS") in public bodies of water threatens water quality, marine ecology and recreational opportunities. AIS readily attach themselves to submerged objects and often repopulate rampantly to the point of harming local marine ecosystems and interfering with recreational activities, including swimming, fishing and boating. With regards to boating, AIS often infiltrate the raw water intake of a motorboat and attach to inner surfaces of the engine cooling system. Over time, collection of AIS within the cooling system can restrict the ability of raw water to flow through the system, thereby inhibiting the ability of the system to properly cool the engine. Further, unless AIS that infiltrate the systems of a motorboat during operation in a first body of water are killed or otherwise eliminated, they can easily and unknowingly be transferred to a second body of water in which the motorboat subsequently operates, thereby exacerbating the AIS problem in public waterways.

It is well known that AIS can be quickly killed by oxygen deprivation, for example, via exposure to water heated to a temperature of approximately 140 degrees Fahrenheit (° F.) or higher. Accordingly, after operation in a body of water, it is generally desirable to flush the cooling system of a motorboat and other portions of the motorboat exposed to the potentially AIS-infested raw water, with hot water. While some lakes and waterways provide publicly-accessible flushing stations equipped with a hot water supply, others do not. Further, even if a flushing station is provided, it may be positioned at a location that is inconvenient for some boaters, or boaters may be required to wait in long lines to use the station.

While prior attempts have been made to provide systems that treat AIS-affected water passages of a motorboat with water heated by the motorboat engine, such systems have proved deficient in various ways. Accordingly, there remains a need for improvement in systems and methods for heating water to be used for AIS flushing, as well as other onboard applications.

SUMMARY

According to an exemplary embodiment of the invention, an onboard heat exchange system for an engine-powered watercraft comprises a water intake that draws water from an external water source. The heat exchange system comprises an engine cooling system and a water heating system.

The engine cooling system circulates coolant through a watercraft engine for cooling thereof. The engine cooling system includes a first heat exchanger through which coolant and water from the water intake are directed. In the first heat exchanger, heat is transferred from the coolant to the water to cool the coolant. The heated water is discharged from the watercraft into the external water source, free of unwanted aquatic invasive species due to the operation of the present invention.

The water heating system has a second heat exchanger coupled to the engine cooling system. Engine coolant from the first heat exchanger and water from the water intake are directed to the second heat exchanger, in which heat is transferred from the coolant to the water to heat the water inside the second heat exchanger. The water heating system directs heated water from the second heat exchanger to at least one of an intake conduit proximate the water intake and at least one onboard accessory system for flushing thereof to kill aquatic invasive species.

According to another exemplary embodiment of the invention, an onboard heat exchange system for a watercraft having an engine includes a system intake and first and second heat exchangers. The system intake is arranged to draw water from an external water source. The first heat exchanger transfers heat to the drawn water from a coolant circulated through the engine and has an outlet that directs heated water toward an engine exhaust system for ejection therethrough. The second heat exchanger transfers heat to the drawn water from the coolant, and has an outlet that directs heated water toward at least one of an intake conduit and at least one onboard accessory system for flushing to kill aquatic invasive species.

According to another aspect of the invention, a method of heating water onboard a watercraft having an engine cooled by a liquid cooling system includes drawing water from an external water source through a water intake, straining the water and then splitting the inlet water flow into two flows through first and second water inlet conduits, respectively. The water passing through the first water inlet conduit flows into a first heat exchanger to absorb heat from coolant passing through the engine in a closed loop system. The first heat exchanger is part of the engine cooling system which functions to cool the engine. After passing through the first heat exchanger, the water heated by the hot coolant exits the boat through a water outlet conduit.

The water passing through the second water inlet conduit flows into a second heat exchanger to be heated inside the second heat exchanger to a temperature greater than 140° F. An auxiliary loop from the closed loop coolant system passes through the second heat exchanger. The heated coolant inside the auxiliary loop transfers heat from the heated coolant inside the auxiliary loop to the water. The water is contained within the second heat exchanger until the water reaches a predetermined temperature, at which point the heated water is then released through an outlet of the second heat exchanger. The heated water from the second heat exchanger is then directed to one or more onboard accessory systems at a temperature greater than 140° F. for purposes of flushing the onboard accessory system(s) to kill unwanted aquatic invasive species. Additionally, or alternatively, the heated water may be directed to an intake conduit proximate the water intake at a temperature greater than 140° F. for purposes of flushing all of the passages or conduits inside the boat so water exiting the boat is free of unwanted aquatic invasive species.

According to another aspect of the invention, a heat exchange method for use onboard an engine-powered watercraft having an engine cooling system comprises drawing water from an external water source through a water intake. The method further comprises directing water from the water intake to a first heat exchanger and to a second heat exchanger. The method then comprises directing coolant of the engine cooling system through a first heat exchanger to transfer heat from the coolant to water located within the first heat exchanger and thereby cool the coolant. The coolant of the engine cooling system is directed through a second heat exchanger to transfer heat from the coolant to water located within the second heat exchanger and thereby heat the water in the second heat exchanger. Heated water from the second heat exchanger is directed to at least one of an intake conduit proximate the water intake and at least one onboard accessory system for flushing thereof to kill aquatic invasive species.

Directing water from the water intake to a first heat exchanger and to a second heat exchanger comprises passing the water through different conduits. Directing coolant of the engine cooling system through the first heat exchanger comprises using a pump. Water passing through the first heat exchanger is discharged from the watercraft. Heated water from the second heat exchanger may be pumped either to a raw water intake conduit to kill an aquatic invasive species residing in the engine cooling system and/or to at least one onboard accessory system for flushing thereof to kill undesirable aquatic invasive species.

Various additional features and advantages of the invention will become more apparent to those of ordinary skill in the art upon review of the following detailed description of exemplary embodiments taken in conjunction with the accompanying drawings. The drawings, which are incorporated in and constitute a part of this specification, illustrate one or more exemplary embodiments of the invention and, together with the general description given above and the detailed description given below, serve to explain the exemplary embodiments.

BRIEF DESCRIPTION OF THE DRAWINGS

Like reference numerals are used to indicate like parts throughout the various figures of the drawings.

DETAILED DESCRIPTION

Figure 1:
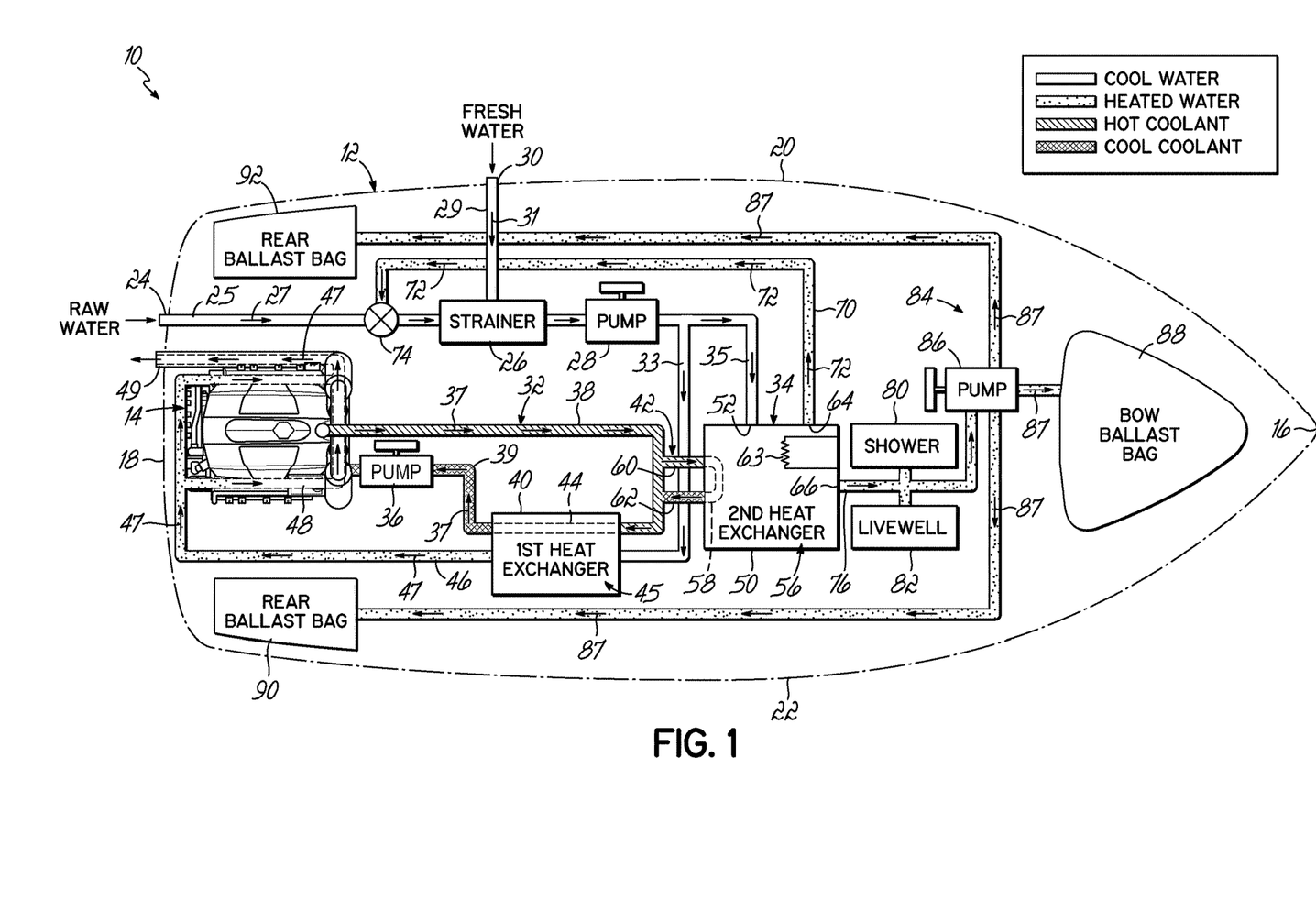
FIG. 1 is a schematic view of a marine heat exchange system according to an exemplary embodiment of the invention, the heat exchange system including an engine cooling system having a first heat exchanger and a water heating system having a second heat exchanger.

Referring to FIG. 1, a marine heat exchange system 10 according to an exemplary embodiment of the invention is schematically shown, arranged onboard a motorboat 12 having an internal combustion engine 14. The motorboat 12 generally includes a bow 16, a stern 18, a port side 20, and a starboard side 22. The engine 14 is shown mounted in an "inboard" configuration and drives a propeller shaft (not shown) that rotates a propeller (not shown), which propels the motorboat 12 through a body of water. In other embodiments, the engine 14 may be mounted in various alternative configurations as desired, such as an inboard/outboard (or "sterndrive") configuration, for example.

The heat exchange system 10 includes two systems: 1) an engine cooling system 32 which functions to cool the engine 14, and 2) a water heating system 34 which functions to heat water entering the motorboat 12 for purposes of killing undesirable aquatic invasive species and other purposes described below. Each of the two systems 32, 34 uses either a raw water intake 24 or a fresh water intake 30 to supply water to the systems 32, 34. The raw water intake 24, shown arranged at the stern 18, draws raw water from a body of water in which the motorboat 12 is situated. The raw water is drawn from the raw water intake 24 through a raw water intake conduit 25 in a direction toward a strainer 26, as indicated by flow arrow 27, by an intake pump 28 located downstream of the strainer 26. The raw water intake 24 may be in the form of a conduit that extends through a hull of the motorboat 12 and into the body of water, or any other known form or apparatus. In this regard, drawing of the raw water into the intake conduit 25 may be facilitated by ram pressure generated by forward motion of the motorboat 12, and the raw water intake 24, through the body of water. While the raw water intake 24 is shown arranged at the stern 18 of the motorboat 12, it will be appreciated that the raw water intake 24 may be arranged at any other suitable location on the motorboat 12 as desired.

The heat exchange system 10 may also include a fresh water intake 30 to which a water hose (not shown), such as a garden hose, may be removably coupled for providing fresh water to the heat exchange system 10, for example when the motorboat 12 is trailered or otherwise lifted from a body of raw water. As such, the fresh water intake 30 may be employed as an alternative to the raw water intake 24. The fresh water is drawn by the intake pump 28 through a second intake conduit 29 in a direction toward the strainer 26, as indicated by flow arrow 31. While the fresh water intake 30 is shown extending through the port side 20 of the motorboat 12, the fresh water intake 30 may be arranged at any suitable location on the motorboat 12, upstream from the intake pump 28.

Moving downstream in FIG. 1, the water intake pump 28 directs drawn water through a first water inlet conduit 33 to a first heat exchanger 40 of an engine cooling system 32. Separately, the water intake pump 28 also directs drawn water through a second water inlet conduit 35 to a second heat exchanger 50 of a water heating system 34. Features of the second heat exchanger 50 are shown in greater detail in FIGS. 2 and 3, described below.

The engine cooling system 32, shown in FIG. 1, cools the engine 14 and is shown in the form of a "closed" cooling system having a closed-loop, main coolant flow path through which liquid coolant is circulated by a coolant pump 36. Starting at the engine 14 and moving in a clockwise direction in FIG. 1, as indicated by flow arrows 37, the main coolant flow path of the engine cooling system 32 is defined by (i) internal coolant passages (not shown) formed within the engine 14, (ii) a first coolant conduit 38 coupled to the engine 14 and communicating with the engine coolant passages, (iii) a heat exchange conduit 44 located within the first heat exchanger 40 and coupled at its inlet end to the first coolant conduit 38, and (iv) a second coolant conduit 39 coupled to an outlet end of the heat exchange conduit 44 and directing engine coolant back toward the engine 14. The coolant pump 36 is shown connected to the second coolant conduit 39 at a location upstream from the engine 14, for recirculating the coolant back through the engine 14. However, it will be appreciated that the coolant pump 28 may be located at any suitable alternative location along the closed-loop cooling path of the engine cooling system 32. Additionally, while each of the first and second coolant conduits 38, 39 is shown schematically as a single conduit, it will be appreciated that each of these conduits 38, 39 may include a plurality of interconnected conduit portions.

Within the internal coolant passages of the engine 14, the engine coolant absorbs heat produced by the engine 14 during operation. During this heat absorption stage, the coolant may be heated to temperatures of 160° F. or more. From the engine 14, the hot coolant flows through the first coolant conduit 38 in a direction toward the first heat exchanger 40, as indicated by arrows 37. Before reaching the first heat exchanger 40, a portion of the hot coolant is diverted through an auxiliary coolant loop 42 shown coupled to the first coolant conduit 38. As described in greater detail below, the hot coolant directed through the auxiliary coolant loop 42 transfers heat to water contained within the second heat exchanger 50 of the water heating system 34, and is then returned to the main coolant flow passing through the first coolant conduit 38 upstream of the first heat exchanger 40.

Continuing downstream, from the first coolant conduit 38, the hot coolant is directed into the heat exchange conduit 44 of the first heat exchanger 40. As the hot coolant flows through the heat exchange conduit 44, heat is transferred from the hot coolant to cool water flowing through a heating chamber 45 of the first heat exchanger 40, thereby cooling the coolant and heating the water. The water within the heating chamber 45 is received from the first water inlet conduit 33. Cooled engine coolant then exits the heat exchange conduit 44 and passes through the second coolant conduit 39 to be recirculated through the engine 14 by the coolant pump 36. In this manner, continuous cooling is provided to the engine 14 by the coolant within the closed loop of the engine cooling system 32.

Water heated within the heating chamber 45 of the first heat exchanger 40, as described above, exits the heating chamber 45 and flows downstream through a water outlet conduit 46, as indicated by arrows 47. The heated water continues downstream through an engine exhaust system water jacket 48, shown schematically, to thereby cool an exhaust system of the engine 14. After passing through the exhaust system water jacket 48, the water is ejected to an external environment, such as the body of water in which the boat 12 is operating, through an exhaust outlet pipe 49, shown arranged at the stern 18.

The engine coolant circulated through the engine cooling system 32 may be in the form of a liquid chemical (e.g., glycol), fresh water, or a mixture thereof. Further, while the engine cooling system 32 is shown in the form of a "closed" cooling system, in alternative embodiments, the liquid cooling system 32 may be an "open" cooling system that circulates coolant in the form of raw water drawn from an external body of water through the raw water intake 24, as generally described above.

Referring now to the water heating system 34 shown in FIG. 1, the water heating system 34 includes a second heat exchanger 50 that transfers heat from hot engine coolant, circulated by the engine cooling system 32, to cool water received into the second heat exchanger 50 from one of the water intakes 24, 30. In particular, the second heat exchanger 50 includes a water inlet 52 that receives drawn cool water from the second water inlet conduit 35, and an interior heating chamber 56 into which the cool water is directed.

Figure 3:
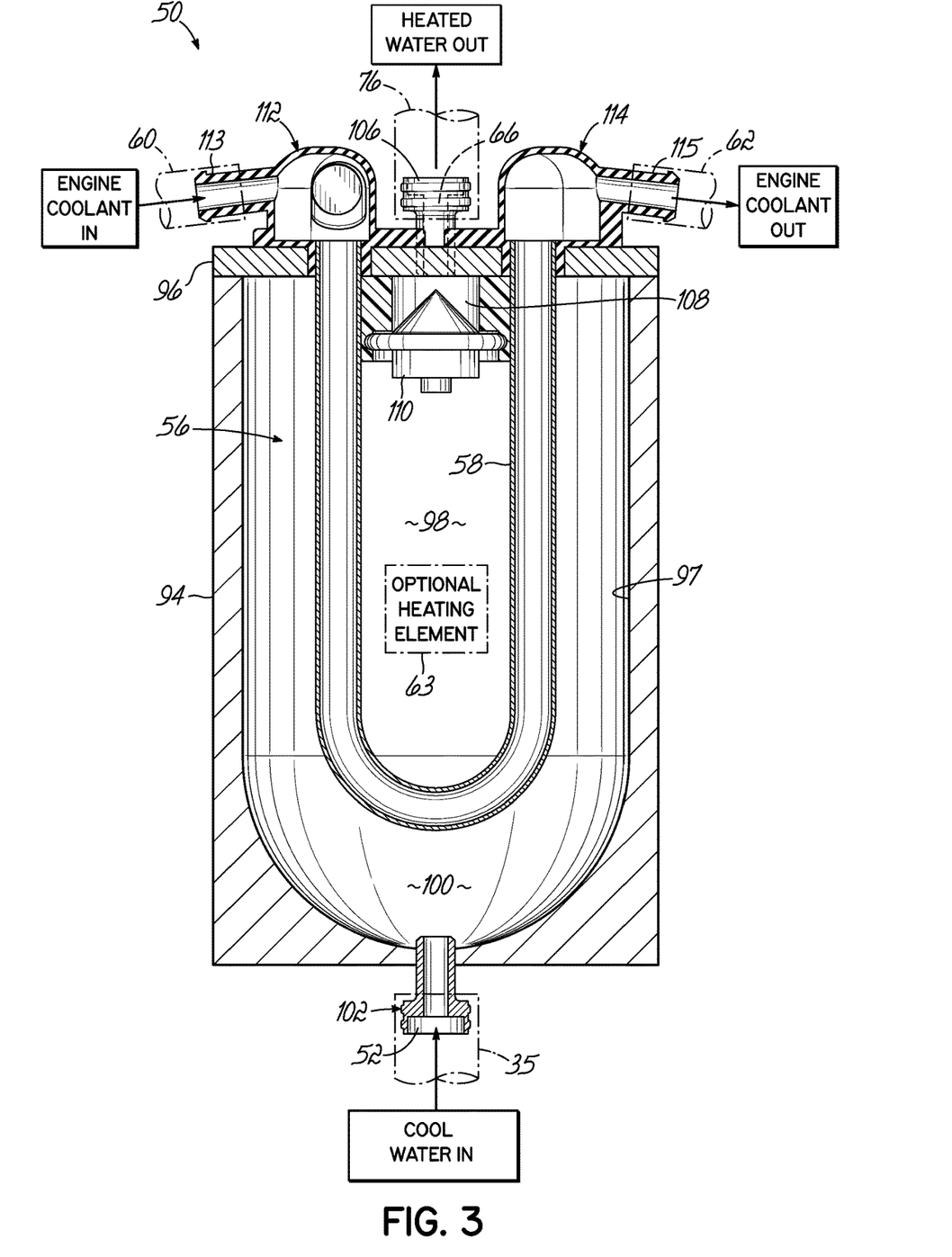
FIG. 3 is a side cross-sectional view taken along line 3-3 in FIG. 2, showing internal details of the second heat exchanger.

As shown in FIG. 3, a heat exchange conduit 58, which is part of the auxiliary coolant loop 42 shown in FIG. 1, is arranged within the heating chamber 56 of the second heat exchanger 50. Hot coolant flowing through the engine cooling system 32, in particular through the auxiliary coolant loop 42, heats water received within the interior heating chamber 56 of the second heat exchanger 50. As shown in FIG. 1, the heat exchange conduit 58 is coupled at an inlet end to an inlet leg 60 of the auxiliary coolant loop 42, and at an outlet end to a return leg 62 of the auxiliary coolant loop 42.

The inlet leg 60 of the auxiliary coolant loop 42 diverts a portion of the coolant flow flowing through the first coolant conduit 38 along the main coolant flow path of the engine cooling system 32. The inlet leg 60 directs the coolant from the first coolant conduit 38 into the heat exchange conduit 58 of the second heat exchanger 50. After the diverted coolant passes through the heat exchange conduit 58, the return leg 62 returns the coolant from the heat exchange conduit 58 within the second heat exchanger 50 to the main coolant flow path in the first coolant conduit 38. Accordingly, the heat exchange conduit 58 is arranged in "parallel" relationship with the main coolant flow path of the engine cooling system 32 and does not interfere with the flow of coolant. In alternative embodiments, the first coolant conduit 38 may be coupled directly to the heat exchange conduit 58, so as to be in "series" relationship with the main coolant flow path (i.e., without the inlet leg 60 and the return leg 62). In this alternative configuration, all of the coolant passing through the first coolant conduit 38 would be directed through the heat exchange conduit 58.

In the exemplary embodiment shown in FIG. 1, the auxiliary coolant loop 42 fluidly communicates with the main coolant flow path of the engine cooling system 32 via a coupling to the first coolant conduit 38. However, in alternative embodiments, this fluid communication may be established by coupling the auxiliary coolant loop 42 to the engine cooling system 32 at any suitable location that is downstream of the internal coolant passages of the engine 14 and upstream of the heat exchange conduit 44 of the first heat exchanger 40.

As hot engine coolant flows through the heat exchange conduit 58 of the second heat exchanger 50, heat is transferred from the hot engine coolant to cool water contained within the heating chamber 56. This water heating process may be facilitated by a heating element 63 arranged within the heating chamber 56, for example. The heating element 63 may be powered by a 12 or 24 volt D.C. battery or any other known power source. As described in greater detail below in connection with FIGS. 2 and 3, the water within the heating chamber 56 is heated to a predetermined temperature, for example, 140° F., before it is released from the heat exchanger 50 through a first water outlet 64 and/or a second water outlet 66. Coolant flowing through the heat exchange conduit 58 may undergo a slight cooling effect when dissipating heat to the water contained within the heating chamber 56. Consequently, and advantageously, the coolant within the auxiliary coolant loop 42 may have a slight cooling effect on the main coolant flow in the engine cooling system 32 upon return of the coolant through the return leg 62 of the auxiliary coolant loop 42.

Still referring to FIG. 1, heated water released from the second heat exchanger 50 through the first water outlet 64 is directed through a first water outlet conduit 70, in the direction of arrows 72, toward a three-way valve 74 arranged upstream of the first and second heat exchangers 40, 50. As shown, the three-way valve 74 may be coupled directly to the raw water intake conduit 25 at a location upstream from the strainer 26, for example. The three-way valve 74 may be selectively actuated as desired, for example, manually or automatically, between a closed position and an open position for flushing heated water through the heat exchange system 10. Advantageously, the heated water flushed through the system 10 kills aquatic invasive species that have infiltrated the system 10 during operation of the motorboat 12 in a body of water. In an exemplary embodiment, heated water introduced by the three-way valve 74 may be directed downstream by the water pump 28 through the first water inlet conduit 33, the first heat exchanger 40, and the exhaust system water jacket 48. Optionally, the heated water may also be directed by the water pump 28 through the second water inlet conduit 35 and back into the heating chamber 56 of the second heat exchanger 50, or otherwise expelled to the external environment via an outlet (not shown).

In alternative embodiments, the heated water may also be flushed through various other onboard water passages and components that are exposed to raw water during operation of the motorboat 12. In that regard, the heat exchange system 10 may be provided with various additional valves as desired for selectively directing the flow of heated water through the system 10 during flushing.

The second water outlet 66 of the second heat exchanger 50 directs heated water through a second water outlet conduit 76 to one or more onboard accessory systems for purposes of flushing them, the heated water being at least 140° F. to kill unwanted aquatic invasive species. In an exemplary embodiment, as shown in FIG. 1, such onboard accessory systems may include, but are not limited to, a shower system 80, a livewell system 82, and/or a ballast system 84, each being shown schematically.

Figure 1A:
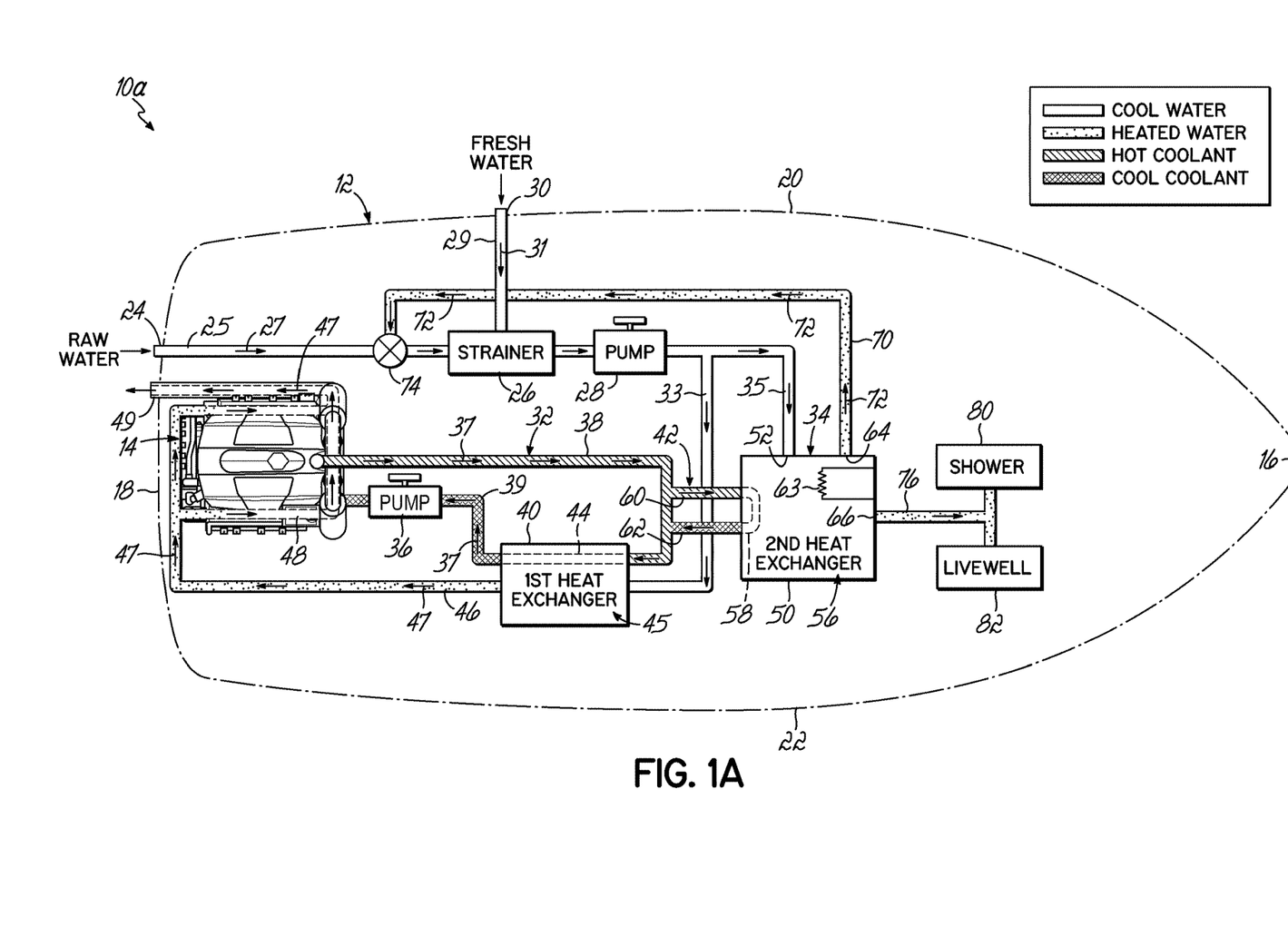
FIG. 1A is a schematic view of a marine heat exchange system according to another exemplary embodiment of the invention.

The ballast system 84 may include a ballast pump 86 that selectively directs the heated water to one or more ballast containers, as indicated by flow arrows 87, such as a bow ballast bag 88 and port and starboard side rear ballast bags 90, 92, for example. Various alternative configurations of ballast containers may be provided. It will be appreciated that, if desired, the heat exchange system 10 may be employed on a motorboat that does not include a ballast system, such as a non-wakeboarding motorboat. By way of example, FIG. 1A shows an exemplary alternative heat exchange system 10a in which the ballast system 84 is omitted.

In exemplary embodiments, an onboard accessory system to which heated water is directed from the second heat exchanger 50 may include one or more water storage tanks, or reservoirs, into which the heated water may be directed and temporarily stored, and from which the water may be selectively drawn at a later time for a selected use. In that regard, any one or multiple of the exemplary shower system 80, the livewell system 82, or the ballast system 84 may include a water storage tank into which heated water from the second heat exchanger 50 is stored. Each water storage tank may be employed as an upstream preliminary holding tank into which water from the second heat exchanger 50 is directed before reaching its useful destination downstream (e.g., a ballast bag), or as a downstream overflow tank into which excess water not needed by the accessory system is directed.

Advantageously, the heated water generated by the water heating system 34 is isolated from direct contact with the engine 14 and its exhaust gases during the water heating process described above. Accordingly, the water delivered to each of the onboard accessory systems 80, 82, 84 is free of carbon monoxide and other harmful contaminants that might otherwise be imparted to water heated by direct circulation through the engine 14 for heating.

Figure 2:
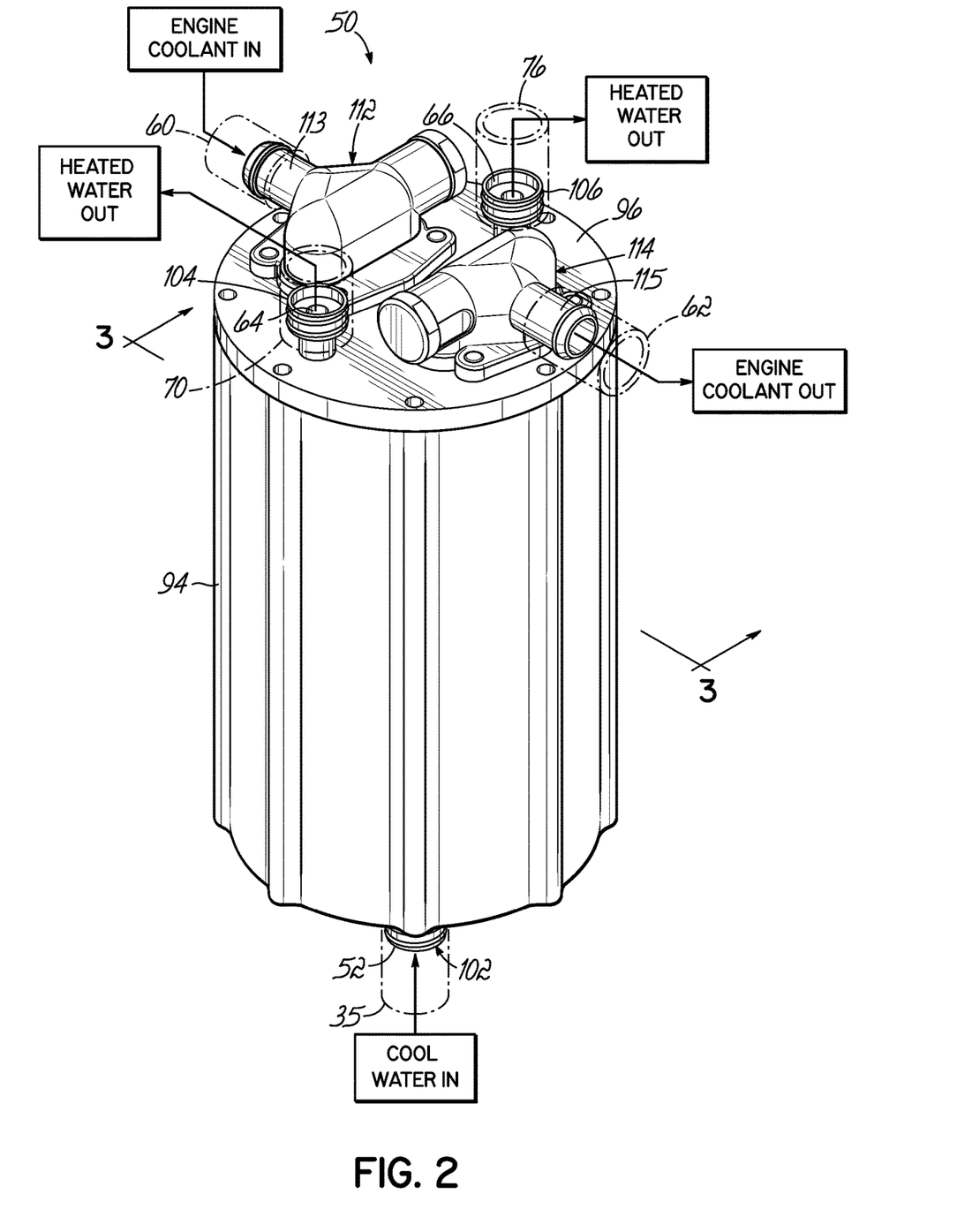
FIG. 2 is a perspective view of an exemplary embodiment of the second heat exchanger of the water heating systems of FIGS. 1 and 1A.

Referring to FIGS. 2 and 3, additional details of an exemplary embodiment of the second heat exchanger 50, of the water heating system 34, are shown. The second heat exchanger 50 includes a generally cylindrical main body 94 that defines the interior heating chamber 56, and an upper plate 96 that removably couples to an upper end of the main body 94 and supports the heat exchange conduit 58. In exemplary embodiments, the main body 94 may be sized and shaped to define a heating chamber volume of approximately two to three gallons. As shown in FIG. 3, an inner wall 97 of the main body 94 may be shaped to define a cylindrical upper chamber portion 98 and a dome-shaped lower chamber portion 100.

The water inlet 52 of the second heat exchanger 50 is defined by a water inlet fitting 102 that projects from a lower surface of the main body 94 and communicates with the lower chamber portion 100. The first and second water outlets 64, 66 are defined by corresponding water outlet fittings 104, 106 that project from the upper plate 96. Each of the water fittings 102, 104, 106 may be threaded for engagement with the water inlet conduit 35 and the water outlet conduits 70, 76, shown in FIG. 1, respectively.

Referring to FIG. 3, the second heat exchanger 50 further includes an interior water outlet chamber 108 disposed above the heating chamber 56. The water outlet chamber 108 communicates at an upper end with the first and second water outlets 64, 66 defined by the first and second water outlet fittings 104, 106 (though only the second water outlet 66 and outlet fitting 106 are seen in the cross-sectional view of FIG. 3). The water outlet chamber 108 is sealed from the heating chamber 56 by an outlet valve 110 shown in the form of a self-regulating thermostatic radiator valve. The outlet valve 110 is configured to move from a closed position to an open position upon reaching a predetermined temperature. For example, the outlet valve 110 may open upon reaching approximately 140° F. with the water heated within the heating chamber 56.

When the outlet valve 110 moves to its open position, heated water within the heating chamber 56 is released into the water outlet chamber 108, and flow outwardly through the first water outlet 64 and/or the second water outlet 66 into the respective water outlet conduit 70, 76. In exemplary embodiments, the outlet valve 110 may be configured to selectively direct an outflow of heated water through only one of the water outlets 64, 66. The water outlet conduits 70, 76 then direct the heated water as generally described above in connection with FIG. 1.

While shown in the form of a thermostatic radiator valve 110, the outlet valve may be of various alternative valve types known in the art. Further, the outlet valve may be coupled to an actuating device (not shown) that may be controlled to selectively open and close the outlet valve, for example, based on a sensed temperature of the water within the heating chamber 56.

As best shown in FIG. 3, the heat exchange conduit 58 extends downwardly into the heating chamber 56 and is joined at an inlet end to a coolant inlet fitting 112 secured to the upper plate 96, and is joined at an outlet end to a coolant outlet fitting 114 secured to the upper plate 96. The coolant inlet fitting 112 includes a stem 113 that couples to and fluidly communicates with the inlet leg 60 of the auxiliary coolant loop 42, and the coolant outlet fitting 114 includes a stem 115 that couples to and fluidly communicates with the return leg 62 of the auxiliary coolant loop 42, shown in FIG. 1. In exemplary embodiments, as shown in FIG. 3, the heat exchange conduit 58 may extend along a generally U-shaped path. While only one U-shaped segment is seen in FIG. 3, it will be appreciated that the heat exchange conduit 58 may include multiple segments, U-shaped segments, or segments of various other shapes. Further, the heat exchange conduit 58 may be formed of copper or titanium, for example, or any other suitable material.

The exemplary marine heat exchange system 10 disclosed herein advantageously provides first and second heat exchangers 40, 50 for simultaneously cooling a marine engine 14 and producing a supply of heated water using heat generated by the engine 14. As described above, the heated water can be implemented for various onboard applications. A particularly advantageous application is the flushing of onboard raw water passages to eliminate aquatic invasive species implanted therein, and thereby defend against undesirable clogging of the raw water passages and unwanted spreading of the invasive species between bodies of water. As described above, such onboard raw water passages may include the raw water inlet conduit 33 and the first heat exchanger 40, of the engine cooling system 32. The heated water can also be directed for use with one or more onboard accessory systems, such as a shower system 80, a livewell system 82, and/or a ballast system 84. Moreover, the fully onboard arrangement of the system 10 provides convenience and ease of use to boaters by eliminating the need to employ land-based or otherwise off-board water heating equipment.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An onboard heat exchange system for an engine-powered watercraft, the system comprising:
   a water intake that draws water from an external water source;
   an engine cooling system that circulates coolant through a watercraft engine for cooling thereof;
   a first heat exchanger through which coolant from the engine cooling system and water from the water intake are directed; and
   a second heat exchanger through which heated coolant from the the watercraft engine passes and through which water from the water intake passes, and in which heat is transferred from the coolant to the water to thereby heat the water,
   wherein heated water from the second heat exchanger passes to one or more ballast bags.

2. The system of claim 1, wherein the watercraft engine is an inboard engine.

3. The system of claim 1, wherein the coolant is contained within a closed loop system.

4. The system of claim 1, further comprising a fresh water intake to which a water hose may be connected for providing fresh water to the heat exchange system.

5. The system of claim 1, further comprising a strainer downstream of the water intake.

6. The system of claim 5, further comprising an intake pump downstream of the strainer.

7. The system of claim 1, wherein the second heat exchanger heats the water therein to a temperature of at least 140° F.

8. An onboard heat exchange system for a watercraft having an engine, the system comprising:
   a raw water intake conduit downstream of a raw water intake;
   a first water inlet conduit;
   a second water inlet conduit;
   an intake pump for drawing raw water through the raw water intake conduit into the first and second water inlet conduits;
   a first heat exchanger for cooling a coolant circulated through the engine with raw water from the first water inlet conduit; and
   a second heat exchanger that transfers heat to the raw water from the coolant and having an outlet that directs heated water toward at least one of the raw water intake conduit and at least one onboard accessory system for flushing thereof to kill aquatic invasive species.

9. The onboard heat exchange system of claim 8, wherein the outlet of the second heat exchanger directs heated water through a first water outlet conduit toward a three-way valve arranged upstream of the first and second heat exchangers.

10. The onboard heat exchange system of claim 8, wherein the second heat exchanger includes a second outlet that directs heated water toward the at least one onboard accessory system.

11. The onboard heat exchange system of claim 8, wherein the outlet of the second heat exchanger directs heated water to a location upstream of the first heat exchanger.

12. The system of claim 8, wherein the onboard accessory system includes at least one of a shower system, a livewell system, or a ballast system.

13. The onboard heat exchange system of claim 8, wherein the second heat exchanger includes a valve that opens to release heated water through the outlet when the heated water reaches a predetermined temperature.

14. The onboard heat exchange system of claim 13, wherein the valve is a thermostatic radiator valve.

15. A heat exchange method for use onboard an engine-powered watercraft having an engine cooling system, the method comprising:
- drawing water from an external water source through a water intake;
- directing water from the water intake to a first heat exchanger and to a second heat exchanger;
- directing coolant of the engine cooling system through a first heat exchanger to transfer heat from the coolant to water located within the first heat exchanger and thereby cool the coolant;
- directing coolant of the engine cooling system through a second heat exchanger to transfer heat from the coolant to water located within the second heat exchanger and thereby heat the water in the second heat exchanger; and
- directing heated water from the second heat exchanger to at least one onboard accessory system for flushing thereof to kill aquatic invasive species.

16. The method of claim 15, wherein directing water from the water intake to a first heat exchanger and to a second heat exchanger comprising passing the water through different conduits.

17. The method of claim 15, wherein directing coolant of the engine cooling system through the first heat exchanger comprises using a pump.

18. The method of claim 15, wherein water passing through the first heat exchanger is discharged from the watercraft.

19. The method of claim 15, wherein heated water from the second heat exchanger is pumped to a raw water intake conduit to kill an aquatic invasive species residing in the engine cooling system.

20. The method of claim 15, wherein heated water from the second heat exchanger is pumped to at least one onboard accessory system for flushing thereof to kill an aquatic invasive species.

* * * * *